(12) United States Patent
Soon-Shiong et al.

(10) Patent No.: US 12,221,214 B1
(45) Date of Patent: Feb. 11, 2025

(54) DRONE-BASED PAYLOAD MANAGEMENT

(71) Applicant: Nant Holdings IP, LLC, Culver City, CA (US)

(72) Inventors: Patrick Soon-Shiong, Los Angeles, CA (US); John Wiacek, Culver City, CA (US); Nicholas J. Witchey, Laguna Hills, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 18/465,874

(22) Filed: Sep. 12, 2023

(51) Int. Cl.
*B64D 1/16* (2006.01)
*B64U 10/16* (2023.01)
*B64U 20/70* (2023.01)
*B64U 101/45* (2023.01)

(52) U.S. Cl.
CPC ............... *B64D 1/16* (2013.01); *B64U 10/16* (2023.01); *B64U 20/70* (2023.01); *B64U 2101/45* (2023.01); *B64U 2201/10* (2023.01)

(58) Field of Classification Search
CPC . B64D 1/16; B64D 1/18; B64U 10/16; B64U 20/70; B64U 2201/10; B64U 2101/45
See application file for complete search history.

(56) References Cited

U.S. PATENT DOCUMENTS

| | | | |
|---|---|---|---|
| 8,862,285 B2 | 10/2014 | Wong et al. | |
| 9,382,003 B2 * | 7/2016 | Burema | A01C 21/00 |
| 9,852,644 B2 * | 12/2017 | Salnikov | A01B 79/005 |

(Continued)

FOREIGN PATENT DOCUMENTS

| | | | |
|---|---|---|---|
| CN | 115158646 A | * | 10/2022 |
| KR | 101694636 | | 1/2017 |

(Continued)

OTHER PUBLICATIONS

Chandler, David L., "Tackling counterfeit seeds with 'unclonable' labels", retrieved from https://phys.org/news/2023-03-tackling-counterfeit-seeds-unclonable.html, Mar. 22, 2023, Massachusetts Institute of Technology, 3 pages.

(Continued)

*Primary Examiner* — Benjamin P Lee
(74) *Attorney, Agent, or Firm* — STETINA BRUNDA GARRED & BRUCKER

(57) ABSTRACT

A drone-based payload management system includes at least one drone and a drone controller, the drone(s) having first and second payload bays configured to store first and second payloads, respectively. The drone controller may be coupled with the payload bays and may comprise at least one processor and at least one computer readable memory. The memory(ies) may store software instructions executable by the processor(s) to perform operations including obtaining a location of the drone(s) while the drone(s) is deployed, determining a ground attribute value of a ground surface associated with the location, deriving, based on the ground attribute value, a payload ratio of a first amount of the first payload relative to a second amount of the second payload, and causing the first and second payload bays to release the first amount of the first payload and the second amount of the second payload respectively according to the payload ratio.

32 Claims, 6 Drawing Sheets

(56) References Cited

U.S. PATENT DOCUMENTS

| | | | |
|---|---|---|---|
| 10,315,759 | B2 | 6/2019 | Nemovi et al. |
| 10,434,451 | B2 | 10/2019 | Witchey |
| 11,136,243 | B1 | 10/2021 | Soon-Shiong et al. |
| 11,181,516 | B2 * | 11/2021 | Sutton ................ G01N 33/0098 |
| 11,210,573 | B2 | 12/2021 | Wiacek et al. |
| 11,219,852 | B2 | 1/2022 | Witchey |
| 11,235,874 | B2 * | 2/2022 | Jones ..................... B64C 39/024 |
| 11,440,659 | B2 * | 9/2022 | Lin ......................... B64D 47/08 |
| 2009/0007485 | A1 * | 1/2009 | Holland ............... A01C 21/007 47/58.1 R |
| 2014/0303814 | A1 * | 10/2014 | Burema .................. A01C 21/00 901/1 |
| 2015/0302305 | A1 * | 10/2015 | Rupp .................... A01B 79/005 706/46 |
| 2016/0307448 | A1 * | 10/2016 | Salnikov ............. G08G 5/0043 |
| 2018/0158179 | A1 * | 6/2018 | Sauder .................... G06T 11/60 |
| 2018/0184637 | A1 * | 7/2018 | Erickson ................ G05D 1/104 |
| 2019/0071177 | A1 * | 3/2019 | Zvara .................... B64C 39/024 |
| 2020/0122827 | A1 | 4/2020 | Nemovi et al. |
| 2020/0184214 | A1 * | 6/2020 | Casas ..................... G06N 3/006 |
| 2020/0193589 | A1 * | 6/2020 | Peshlov ............... G06V 10/955 |
| 2020/0308015 | A1 | 10/2020 | Myers et al. |
| 2021/0088337 | A1 | 3/2021 | Koubaa |
| 2021/0180270 | A1 | 6/2021 | Meherg et al. |
| 2021/0182978 | A1 * | 6/2021 | Nissing .................. A01B 79/02 |
| 2021/0230815 | A1 | 7/2021 | Meherg et al. |
| 2021/0253249 | A1 * | 8/2021 | Bian ....................... A01C 7/085 |
| 2021/0321601 | A1 * | 10/2021 | Ledebuhr .............. B05B 7/2494 |
| 2022/0185464 | A1 | 6/2022 | Gharib et al. |
| 2022/0212792 | A1 | 7/2022 | Gharib et al. |
| 2022/0227489 | A1 | 7/2022 | Ol et al. |
| 2022/0297822 | A1 | 9/2022 | Ol et al. |

FOREIGN PATENT DOCUMENTS

| | | | |
|---|---|---|---|
| KR | 102504386 | | 3/2023 |
| WO | 2020219974 | | 10/2020 |
| WO | 2021123951 | | 6/2021 |
| WO | WO-2022061771 | A1 * | 3/2022 |
| WO | 2022125132 | | 6/2022 |
| WO | 2022150833 | | 7/2022 |
| WO | 2022159951 | | 7/2022 |
| WO | 2022198225 | | 9/2022 |
| WO | WO-2024028200 | A1 * | 2/2024 .......... A01M 7/0089 |

OTHER PUBLICATIONS

Habte, Lulit et al., "Synthesis, Characterization and Mechanism Study of Green Aragonite Crystals from Waste Biomaterials as Calcium Supplement", Sustainability 2020, 12, 5062, http://www.mdpi.com/journal/sustainability, Jun. 22, 2020, 10 pages.

Asabere, Stephen Boahen et al., "Urbanization Leads to Increases in pH, Carbonate, and Soil Organic Matter Stocks of Arable Soils of Kumasi, Ghana (West Africa)", Frontiers in Environmental Science, Oct. 12, 2018, vol. 6, Article 119, 17 pages.

Vanderklift, Mathew A. et al. "Using Propagules to Restore Coastal Marine Ecosystems," Frontiers in Marine Science, Sep. 15, 2020, vol. 7, Article 724, 15 pages.

Murison, Malek, "Surprising Facts About Spraying Drones," https://enterprise-insights.dji.com/blog/spraying-drones-surprising-facts, Dec. 6, 2021, DJI Enterprise, 8 pages.

Courtman, C. et al., "Selenium concentration of maize grain in South Africa and possible factors influencing the concentration", South African Journal of Animal Science 2012, 42 (Issue 5, Supplement 1), pp. 454-458, South African Society for Animal Science.

DJI Official Website, "AGRAS T20P SPECS", https://www.dji.com/t20p/specs, retrieved Jun. 19, 2023, 6 pages.

"Introducing the Lancaster 5—Your Premium Enterprise Drone", https://www.precisionhawk.com/blog/media/topic/lancaster-5, Apr. 15, 2016, PrecisionHawk, 4 pages.

"Hercules (EA-30X) Technical Specifications", https://www.eavisionag.com/hercules-ea-30x_p14.html?page=2, retrieved Jun. 19, 2023, Suzhou Eavision Robotic Technologies Co., Ltd., 1 page.

"DJI Smartfarm Web", https://ag.dji.com/smartfarm-web, retrieved Jun. 19, 2023, 6 pages.

HG Robotics, "Vetal Tallsitter VTOL Fly Longer and Cover More", retrieved Jun. 19, 2023, 8 pages.

XAG, "XA XP 2020 Agricultural Drone Specs", https://www.xa.com/en/xp2020/specs, retrieved Jun. 19, 2023, 10 pages.

Olick, Diana, "DroneSeed uses swarms of drones to reseed forests after devastating wildfires", https://www.cnbc.com/2022/06/28/droneseed-uses-swarms-of-drones-to-reseed-forests-after-wildfires.html, Jun. 28, 2022, CNBC, 2 pages.

Signé, Landry et al., "How Africa's new Free Trade Area will turbocharge the continent's agriculture industry", https://www.weforum.org/agenda/2023/03/how-africa-s-free-trade-area-will-turbocharge-the-continent-s-agriculture-industry/, Mar. 14, 2023, World Economic Forum, 4 pages.

XAG, "P Series Plant Protection UAS Specs P30 2019", https://www.xa.com/en/pseries/p30specs, retrieved Jun. 19, 2023, 2 pages.

XAG, "XAG P40 Agricultural Drone Specs", https://www.xa.com/en/p40/p40specs, retrieved Jun. 19, 2023, 4 pages.

XAG, "p100 Specs", https://www.xa.com/en/p100/p100specs, retrieved Jun. 19, 2023, 6 pages.

XAG, "XAG V40 Agricultural Drone Specs", https://www.xa.com/en/v40/v40specs, retrieved Jun. 1, 2023, 9 pages.

TOPTECHTOPIC, "Top 5 Agricultural Drones—Amazing Modern Agriculture", https://www.youtube.com/watch?v=yrfKPmMz0Zo, Apr. 16, 2022, 4 pages.

Caskey, Paul, "Drone Mapping & Scouting—AGVUE Technologies", 2018 Mid-Atlantic Fruit & Vegetable Convention: Proceedings for the vegetable, potato, greenhouse, small fruit & general sessions, Jan. 30, 2018, pp. 186-187, Pennsylvania Vegetable Growers Association.

Croner, Justin, "EC Mapping: Why Should We Do This?", 2018 Mid-Atlantic Fruit & Vegetable Convention: Proceedings for the vegetable, potato, greenhouse, small fruit & general sessions, Jan. 30, 2018, pp. 188-189, Pennsylvania Vegetable Growers Association.

Non-Final Office Action in U.S. Appl. No. 18/946,285 mailed on Dec. 16, 2024.

* cited by examiner

DRONE-BASED PAYLOAD MANAGEMENT

CROSS-REFERENCE TO RELATED APPLICATIONS

Not Applicable

STATEMENT RE: FEDERALLY SPONSORED RESEARCH/DEVELOPMENT

Not Applicable

BACKGROUND

Technical Field: The technical field of the present disclosure is drone-based payload delivery.

In the agricultural sector, drone technology has provided new mechanisms for seeding and spraying crops. The use of Unmanned Aerial Vehicles (UAVs) has not only begun to automate the application of seeds and fertilizers but has also introduced ways of gathering data about the ground, which has been used to make informed spraying decisions. However, such conventional techniques have not provided effective means for the deployment of soil additives such as oolitic aragonite that exhibit complex interactions with other payloads and require a high degree of flexibility and control in terms of their relative quantities and other deployment parameters.

BRIEF SUMMARY

The present disclosure contemplates various systems and methods for overcoming the above drawbacks accompanying known related art. One aspect of the embodiments of the present disclosure is a drone-based payload management system. The system may comprise at least one drone and a drone controller. The at least one drone may have a first payload bay and a second payload bay configured to store a first payload and a second payload, respectively. The drone controller may be coupled with the first and second payload bays and may comprise at least one processor and at least one computer readable memory. The at least one computer readable memory may store software instructions executable by the at least one processor to perform operations including obtaining a location of the at least one drone while the at least one drone is deployed, determining a ground attribute value of a ground surface associated with the location, deriving, based on the ground attribute value, a payload ratio of a first amount of the first payload relative to a second amount of the second payload, and causing the first and second payload bays to release the first amount of the first payload and the second amount of the second payload respectively according to the payload ratio.

The system may comprise one or more sensors. The ground attribute value may be determined based on an output of at least one sensor from among the one or more sensors. The one or more sensors may include one or more types of sensors selected from the group consisting of: a GPS sensor, an accelerometer, a LIDAR sensor, a RADAR sensor, a camera, a thermometer, a magnetometer, a gyroscope, an inertial measurement unit (IMU), and a spectrometer, and/or may include other types of sensors. The one or more sensors may be provided in the at least one drone. The ground attribute value may adhere to a ground attribute namespace or ontology. The ground attribute value may quantify, directly or indirectly, one or more attributes selected from the group consisting of: a chemical attribute, an elevation attribute, a slope attribute, a physical attribute, an optical attribute, and a geographical attribute. The ground attribute value may be derived at least in part from an image descriptor. The ground attribute value may be determined in real-time from a digital representation of the ground surface. The ground attribute value may be determined at least in part by reference to a previously characterized attribute of the ground surface associated with the location.

The payload ratio may be derived from the ground attribute value via one or more selected from the group consisting of: a lookup table, a function, and a machine learning model. One or both of the first and second payload bays may comprise a controllable payload aperture coupled with the drone controller. At least one of the first amount and the second amount may comprise an amount released per unit time, an amount released per unit area, or another quantification. The first and second amounts may be measured by weight. The first and second amounts may be measured by volume. The payload ratio may be in the range of 1:100 to 1:1, or other ranges that may be practical for a specific use case. One or both of the first and second payloads may comprise seeds. One or both of the first and second payloads may comprise spores. One or both of the first and second payloads may comprise one or more payloads selected from the group consisting of: seeds, spores, fertilizers, insecticides, liquids, conditioners, worms, biologics, powders, slurries, and Mycorrhizal fungi. The second payload may comprise calcium carbonate (e.g., olitic aragonite, etc.)

The location may comprise one or more selected from the group consisting of: a geolocation, a zip code, a geofenced area, a Schneider 2 (S2) cell, a grid location, a stationary location, a relative location, a landmark, a simultaneous localization and mapping (SLAM) location, a visual simultaneous localization and mapping (vSLAM) location, a wireless triangulation point, and a position relative to one or more beacons. The obtaining of the location may comprise obtaining a location of the at least one drone while the at least one drone is in flight.

The operations may further comprise determining a dispersion of one or both of the first and second payloads on the ground surface. The operations may further comprise causing one or both of the first and second payload bays to conduct a test release prior to the release of the first amount and the second amount, the dispersion being determined based on the test release. The determining of the dispersion may include measuring a time from release to when one or both of the first and second payloads reaches the ground. The operations may further comprise adjusting release of one or both of the first and second payloads based on the dispersion.

The at least one drone may comprise at least one unmanned aerial vehicle (UAV). The at least one drone may comprise at least one autonomous drone. The at least one drone may comprise a fleet of two or more drones, possibly operating in concert. The at least one drone may further have a third payload bay. The first payload bay and the second payload bay may be included in the same drone from among the at least one drone.

Another aspect of the embodiments of the present disclosure is a drone-based payload management method. The method may comprise obtaining a location of at least one drone while the at least one drone is deployed. The at least one drone may have a first payload bay and a second payload bay. The first payload bay may be configured to store a first payload and the second payload bay may be configured to store a second payload. The method may further comprise determining at least one ground attribute value of a ground surface associated with the location, deriving, based on the ground attribute value, a payload ratio of a first amount of the first payload relative to a second amount of the second payload, and causing the first and second payload bays to release the first amount of the first payload and the second amount of the second payload respectively according to the payload ratio.

Another aspect of the embodiments of the present disclosure is a computer program product comprising one or more non-transitory program storage media on which are stored instructions executable by one or more processors or programmable circuits to perform operations for drone-based payload management. The operations may comprise obtaining a location of at least one drone while the at least one drone is deployed. The at least one drone may have a first payload bay and a second payload bay. The first payload bay may be configured to store a first payload and the second payload bay may be configured to store a second payload. The operations may further comprise determining a ground attribute value of a ground surface associated with the location, deriving, based on the ground attribute value, a payload ratio of a first amount of the first payload relative to a second amount of the second payload, and causing the first and second payload bays to release the first amount of the first payload and the second amount of the second payload respectively according to the payload ratio.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems, apparatus, and methods for drone-based payload management. The detailed description set forth below in connection with the appended drawings is intended as a description of several currently contemplated embodiments and is not intended to represent the only form in which the disclosed subject matter may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
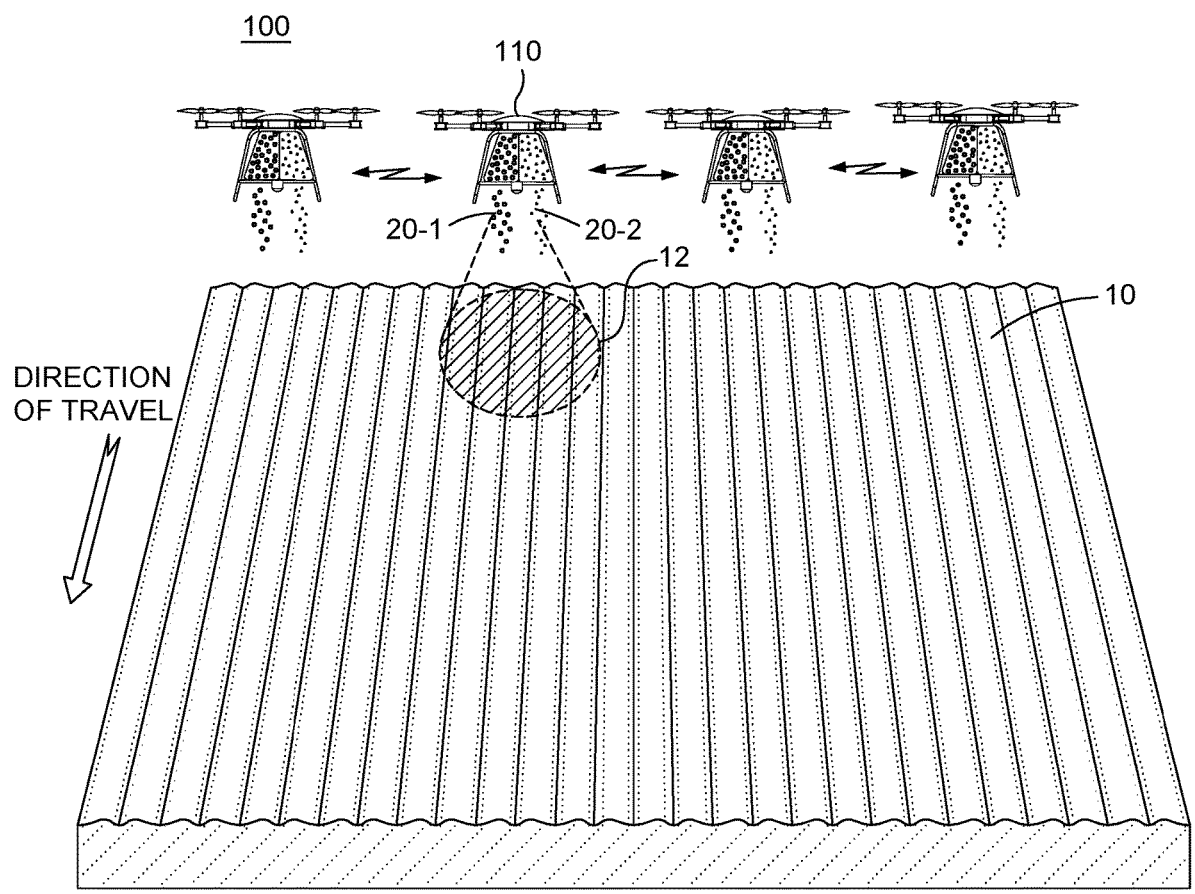
FIG. 1 shows a system for drone-based payload management according to one or more embodiments of the present disclosure.

FIG. 1 shows a system 100 for drone-based payload management according to an embodiment of the present disclosure. The system 100 may include at least one drone 110 such as an unmanned aerial vehicle (UAV). In the illustrated embodiment, for example, a fleet of two or more drones 110 (four pictured in the view of FIG. 1) is provided, though any practical number of drones 110 may be used, including 1, 2, 3, 4, 5, 10, 15, 20, 50, 100, or more, depending on the size of the payload delivery operation. In this regard, the fleet of drones 110 is depicted in FIG. 1 flying over an agricultural field 10 and delivering a first payload 20-1 such as seeds and a second payload 20-2 such as oolitic aragonite (generally or collectively referred to as payloads 20). As shown, each individual drone 110 may deliver both first and second payloads 20-1, 20-2. Alternatively, one drone 110 may deliver the first payload 20-1 while another delivers the second payload 20-2, such that the fleet of drones 110 collectively delivers both payloads 20-1, 20-2 to the agricultural field 10. The payload management system 100 may further include a drone controller 120 configured to obtain a location of the drone(s) 110 while it/they are in flight or otherwise deployed, determine a ground attribute value of the agricultural field 10 or other ground surface associated with the location, and derive, based on the ground attribute value, a payload ratio of a first amount of the first payload 20-1 relative to a second amount of the second payload 20-2. The drone(s) 110 may then release the first amount of the first payload 20-1 and the second amount of the second payload 20-2 respectively according to the payload ratio. Thus, advantageously, the system 100 may enable real-time adjustments to the relative amounts of the payloads 20-1, 20-2 and/or other parameters (e.g., deployment mechanism, drop height, etc.) depending on the ground attributes of the particular field 10 or region 12 thereof. In this way, the system 100 may make it possible to effectively and efficiently deploy complex soil additives and other payloads that may benefit from subtle tweaking of the delivery parameters based on the precise location, time, or other conditions.

As a soil additive, aragonite (e.g., oolitic aragonite) may beneficially provide calcium to support pH buffering while also providing trace nutrients and live bacteria, all without increasing the amount of magnesium in the soil as may occur when limestone is used. In addition, aragonite may effectively decrease the amount of fertilizer needed by holding the nutrients in the soil where they remain available to crops and other plants. At the same time, since the calcium in aragonite breaks down relatively quickly in the soil, aragonite may advantageously be used to address a current need in the short term. As such, it is possible to adaptively add aragonite to soil in differing amounts as needed for arbitrarily small regions of a field 10 by analyzing current conditions (with the same region being reanalyzed and revisited at arbitrary time intervals, e.g., once per day). This property makes it especially important for the sake of efficiency and effectiveness that the quantity of aragonite be finetuned in real time based on the current conditions of the field 10. Moreover, since the ideal amounts of other additives such as fertilizer may depend on the amount of aragonite that is added, while the amount of aragonite and other additives may in turn depend on the quantity of seeds planted or dropped in a given area, it is important to derive relative amounts of multiple payloads to be delivered in combination based on real time conditions.

Figure 2:
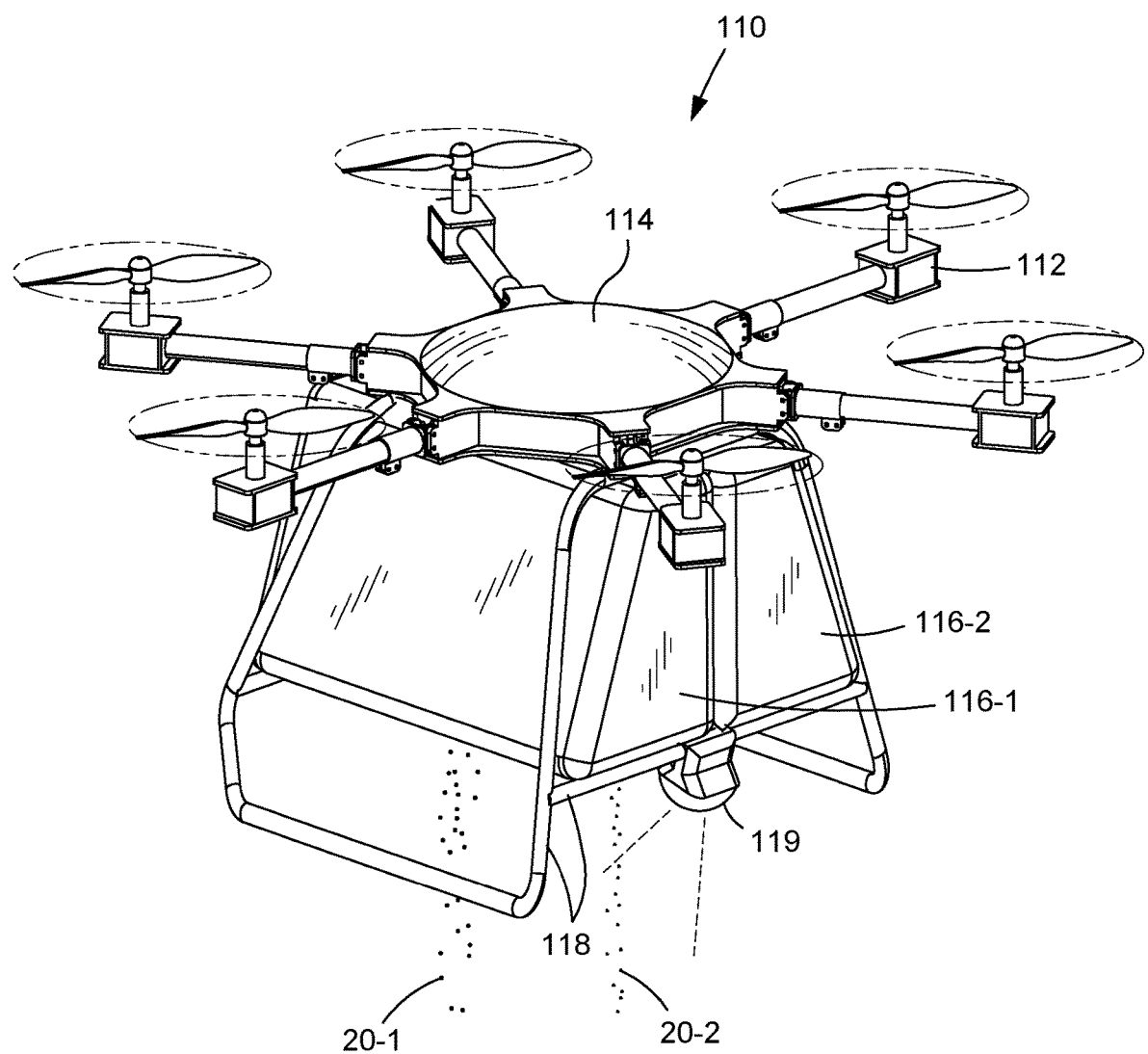
FIG. 2 is a perspective view of a single drone of the system.
Figure 3:
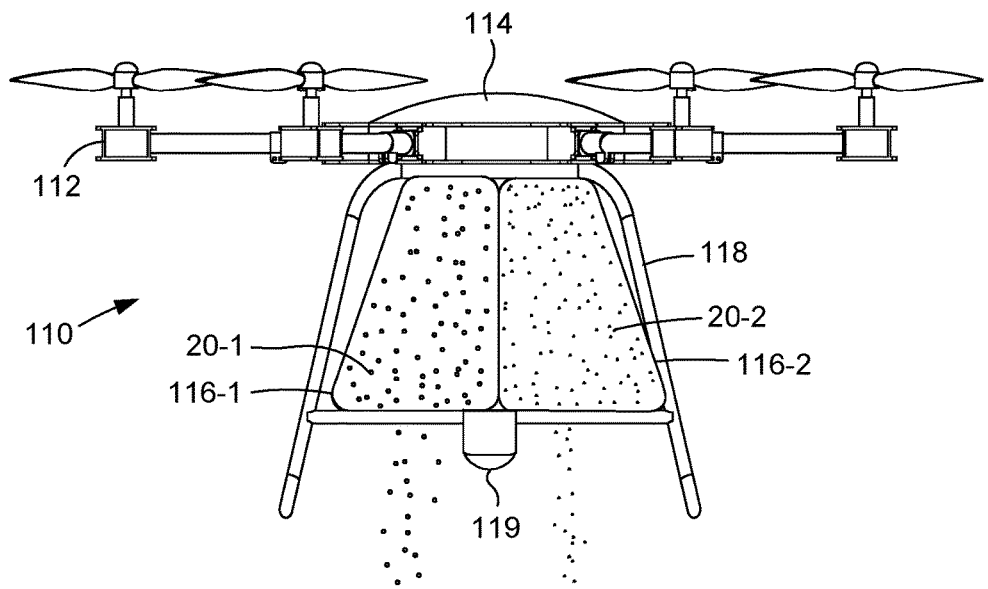
FIG. 3 is front view of the drone.
Figure 4:
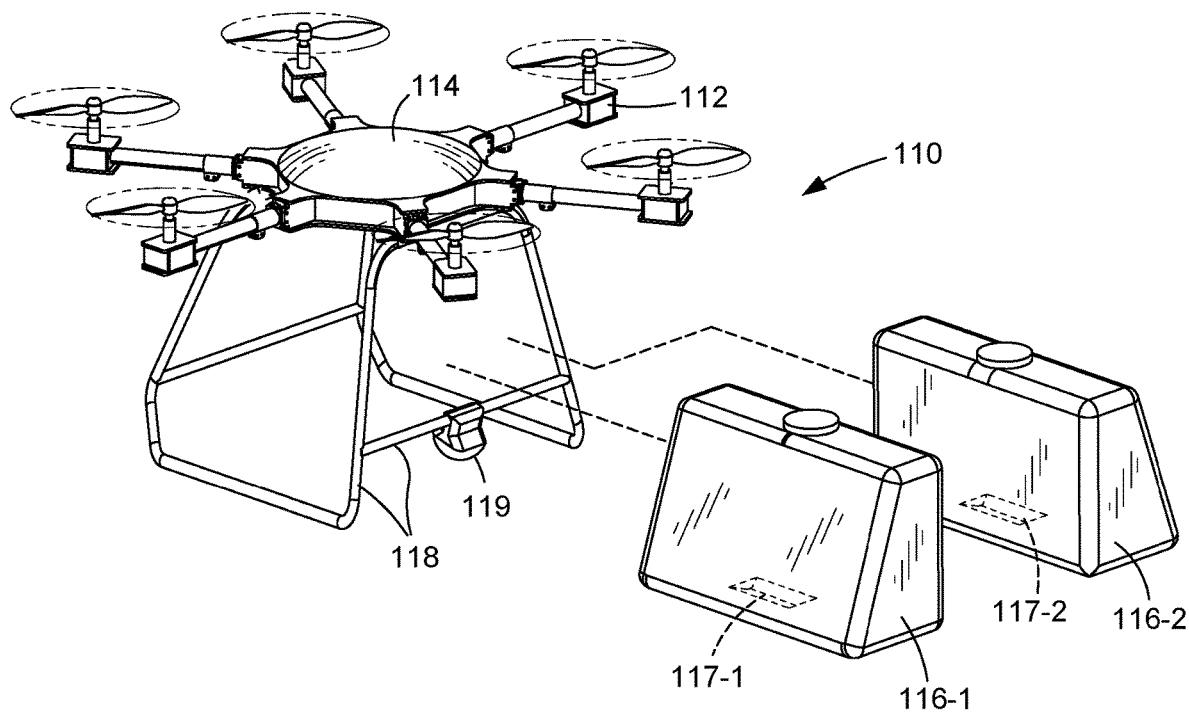
FIG. 4 is an exploded perspective view of the drone.
Figure 5:
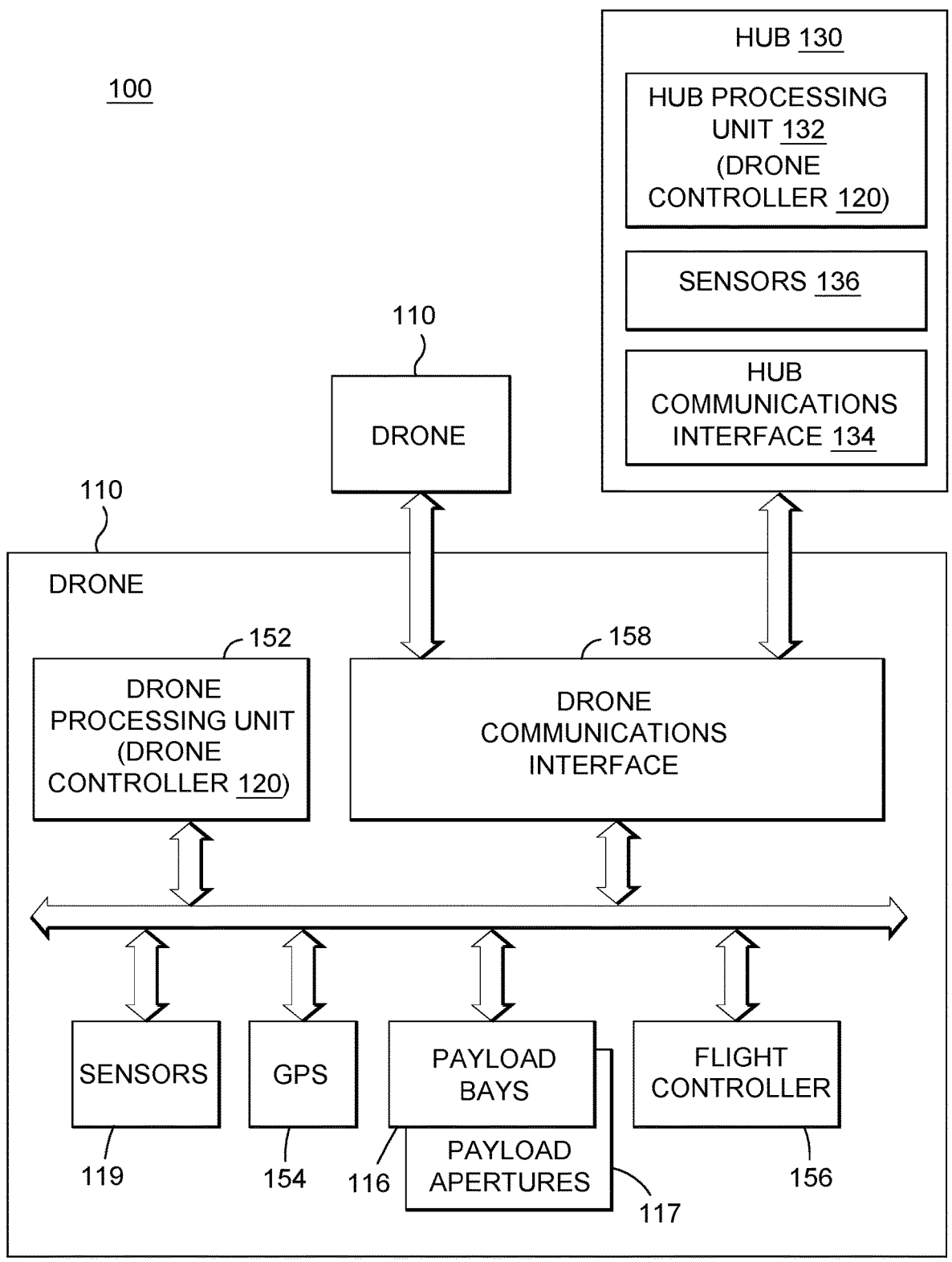
FIG. 5 is a functional block diagram of the system.

FIGS. 2, 3, and 4 are closeup views of a single drone 110 of the system 100. The drone 110 is depicted as an unmanned aerial vehicle (UAV) having a hexacopter design with six propeller units 112 surrounding a central control unit 114, which may be a heavy lift drone, for example. The propeller units 112 may include motors and propellers, and the central control unit 114 may include a flight controller, power supply, fuel tank, engines, sensors, and other systems for controlling the operation of the drone 110. The propeller units 112 and central control unit 114 may be designed and arranged in accordance with well-known multicopter design principles. Other multicopter designs (e.g., quadcopter, octocopter, Y6, etc.) may be used as well, and non-multicopter designs are also contemplated. An example source for drones may include those provided by Toofon, Inc. and as described in U.S. patent application U.S. 2022/0297822 titled "Systems and Method for Efficient Cruise and Hover in VTOL," filed Mar. 17, 2022, the entirety of which is wholly incorporated by reference herein.

As shown, the drone 110 may include a first payload bay 116-1 and a second payload bay 116-2 (generally or collectively referred to as payload bays 116), which may be configured to store the first and second payloads 20-1, 20-2, respectively (see FIG. 3). The payload bays 116-1, 116-2 may be supported by the drone 110 in a suspended configuration. For example, the drone 110 may include a support frame 118 into which the payload bays 116-1, 116-2 may be inserted. It is contemplated that the structure of the payload bays 116 and support frame 118 may allow the payload bays 116 to be easily slotted in and slotted out of, or otherwise removably coupled with, the support frame 118 (see FIG. 4) so that they may be refilled or conveniently swapped with full ones when they are empty. In some cases, the structure of the payload bays 116 and support frame 118 may allow for a modular configuration of the drone 110 in which multiple different payload bays 116 storing different payloads 20 may be alternately loaded onto the drone 110 to suit the particular needs of the user.

The payload bays 116-1, 116-2 may each comprise a respective payload aperture 117-1, 117-2 (generally or collectively referred to as payload apertures 117) that may be controllable by the drone controller 120 (see FIG. 1) as described herein. In this regard, it is contemplated that the drone controller 120 may be on board the same drone 110 having the payload bay 116 in question, such as in the central control unit 114 thereof, or may be located remotely with respect to the drone 110, such as in a different drone 110 (e.g., a master drone 110 responsible for controlling and directing the operations of other drones 110) or in a stationary structure (e.g., a control tower). In either case, the drone controller 120 may be communicatively coupled with the first and second payload bays 116-1, 116-2, e.g., by wired or wireless connection. It is also contemplated that the drone controller 120 may comprise multiple physical devices, with some functionality being performed onboard the drone 110 and other functionality being performed elsewhere, for example, and/or that the device(s) acting as the drone controller 120 may change over time, such as in a case where control of the drone 110 is handed off from one remote device to another as the drone 110 flies from one location to another. The payload apertures 117-1, 117-2 may be controllable to allow for the release of the payloads 20-1, 20-2 in different amounts and/or at different flow rates, causing specified relative amounts of the different payloads 20-1, 20-2 to be delivered as described herein. In the case of simultaneous delivery of multiple payloads 20-1, 20-2, suitable mixing may in some cases be achievable after the payloads 20-1, 20-2 have left the drone 110 and are falling through the air beneath the drone 110. In this regard, the propellers may advantageously enhance the mixing of the payloads 20-1, 20-2 by being positioned to generate wind in the vicinity beneath the payload apertures 117. Alternatively, mixing may be achieved through the provision of a mixing manifold or chute beneath the payload apertures 117, from which the resulting mixture of payloads 20-1, 20-2 may finally be dispensed from a single, combined opening. It is also contemplated that the payload bays 116 (or the outlet of any such manifold or chute) may be positioned far enough beneath the propellers or otherwise outside of the downwash of the propellers such that the dropping of the payload(s) 20 is unaffected by the operation of the propellers. With such a design, it may be unnecessary for the delivery parameters to take into account the effect of the propeller downwash on the dispersion of the payload(s) 20.

As noted above, the drone controller 120 (whether on board or remote from the drone 110) may be configured to determine a ground attribute value of the agricultural field 10 or other ground surface associated with the location of the drone 110. The ground attribute value may be determined based on an output of at least one sensor 119 that may be mounted on or otherwise provided in the drone 110 as shown in FIG. 2 or located remotely from the drone 110 (e.g., on another drone or a stationary structure). In general, the ground attribute value may quantify one or more attributes such as chemical attributes (e.g., pH, presence/quantity of nitrogen, phosphorous, or potassium, etc.), physical attributes (e.g., surface roughness, temperature, ground cover, foliage, vegetation, whether the ground is plowed, whether payload 20 is already present, etc.), optical attributes (e.g., amount of light hitting ground, reflectivity of surface, etc.), and/or geographical attributes (e.g., location, geology, rockiness, presence of irrigation, floodplains, or runoff, etc.). The use of one or more ground attribute values may allow for a standardized characterization of the ground surface for input to machine learning models and other computer-based systems. In this regard, the ground attribute value may adhere to a ground attribute namespace or ontology, whose definitions may be stored in a database locally on board the drone 110 or other structure embodying the drone controller 120 or may be stored and accessed remotely.

A variety of types of sensor 119 are contemplated, including, for example, a GPS sensor, an accelerometer, a LIDAR sensor, a RADAR sensor, a camera, a thermometer, a magnetometer, a gyroscope, and/or an inertial measurement unit (IMU), any of which may be duplicated and/or combined to define a sensor array. Image data collected from a camera, for example, may be used as input to a computer vision model (e.g., using OpenCV) that determines the ground attribute values based on various image features. For example, RGB channels of the image data may be used to determine the color of the ground, where low G relative to R and B may indicate a brown color consistent with soil where a payload 20 has not yet been delivered, whereas a high amount of a predetermined color matching a payload stain color may indicate a location where payload 20 has already been delivered and may thus help to determine the spread of a previous payload drop or of a payload drop that is currently underway. In general, the ground attribute value may be derived at least in part from one or more image descriptors, and, in some cases, image descriptors may map to ground attribute values (e.g., an image descriptor quantifying an amount of green color relative to a background color may be taken to represent an amount of ground cover). Ground attribute values may be measured in real-time from a digital representation of the ground, which may be constructed from different image descriptors captured from different types of cameras or other sensors 119 (in some cases on board different drones 110 or stationary structures) at the same time. To this end, the system 100 may make use of the techniques described in U.S. Pat. No. 11,210,573, issued Dec. 28, 2021 and entitled "Volumetric Descriptors," the entirety of which is wholly incorporated by reference herein.

Based on the ground attribute value(s) associated with the location of the drone 110, the drone controller 120 may derive the payload ratio and coordinate the release of the payloads 20 from the payload bays 116 accordingly. In a relatively simple implementation, the payload ratio may be derived via a mapping of ground attribute values (including combinations of different ground attribute values) to payload ratios, such as through the use of one or more lookup tables (e.g., for discrete or coarsely adjustable payload ratios) or functions (e.g., for continuous or finely adjustable payload ratios). Alternatively, or additionally, the payload ratio may be derived via a machine learning model. In this case, various data features including ground attribute values determined using sensors 119, time-of-day information, wind and other weather-related data (either sensed/predicted or reported from a remote weather service), position information of the drone(s) 110 including height, attitude, velocity, and acceleration, etc., may be input to a model that has been trained using historical data. The output of the model may be the appropriate payload ratio as determined by the model, along with other parameters as described herein. Regardless of how the payload ratio is derived, it is contemplated that the payload ratio may specify the relative amounts of different payloads 20, either as a proportion or percentage (e.g., one part seeds, one part aragonite, two parts fertilizer) or as mass, weight, or volume quantities of each individual payload 20 (e.g., a total amount or an amount released per unit time, which may be based on the size of the area to be covered). In either case, it should be noted that the derived payload ratio may advantageously take into account codependence of multiple different payloads 20, allowing for the efficient and effective delivery of complexly interacting soil additives in a way not possible using conventional systems. In some embodiments, the controller may leverage a lookup table stored in the computer readable memory that is indexed based on location. Based on the location, the lookup table may return instructions regarding what ratio(s) of the payloads should be used for the location, or otherwise how to perform the drop.

Typical payload ratios may depend on the nature of the payloads 20, which may comprise a variety of substances that may be transported and delivered by drones 110 for different purposes. For example, agricultural and other uses of the system 100 may entail one or both of the payloads 20 comprising seeds (e.g., vegetables, corn, wheat, wild flowers, trees, grass, bamboo, berries, etc.), ballistic pellets/plugs/spikes containing seeds or seedlings (e.g., balls that burst on impact or aerodynamic containers shaped to reduce drag and increase speed for ground penetration), spores, fertilizers, insecticides, liquids (e.g., water, etc.), powders, conditioners, animals (e.g., worms, ladybugs, etc.), biologics, Mycorrhizal or other fungi (e.g., to decompose wood, grow mushrooms, etc.), bacteria, materials for erosion control (e.g., bamboo, compost, biostimulants, boron, algae, etc.), materials for carbon sequestration, dirt, and/or calcium carbonate, which may advantageously be in the form of aragonite (e.g., oolitic aragonite). For example, in the case of delivery payloads 20 for erosion control, bamboo seeds may be dropped in areas of high slope while grass seeds are dropped in areas having more gentle slopes, with the relevant ground attribute value(s) including the slope of the ground. In some cases, a single payload 20 may include two or more such substances, such as may be the case if one payload bay 116 contains seeds coated with calcium carbonate. The payload ratio, expressed as a proportion, may be in the range of 1:100 to 1:1, for example, but other ratios may be derived as well. In a case where the one or more drones 110 has, collectively three or more payload bays 116 (e.g., either on a single drone 110 or spread out among several drones 110), it is contemplated that there may likewise be three or more different payloads 20 (e.g., four payloads, five payloads, etc.). As such, the payload ratio need not be limited to specifying the relative amounts of two different payloads 20 but may specify the relative amounts of three or more different payloads 20 as the case may be.

In embodiments that make use of machine learning for the determination of ground attribute values, such as machine vision for color analysis as described above, it is contemplated that such machine learning models for determining ground attribute values may be subsumed into the same machine learning model that may be used for deriving the payload ratio, with only a single, combined model being implemented. To illustrate, in the above example where RGB channel data collected by a camera may be input to a machine vision algorithm to determine a ground attribute value such as the amount of vegetation, the machine learning model that derives the payload ratio could, in principle, take the amount of vegetation as input, but might instead take the original RGB channel data as input. In the latter case, the RGB channel data, rather than the amount of vegetation (which might never be explicitly determined) may be regarded as the relevant ground attribute value from which the payload ratio is derived. Training of the machine learning models may be based on existing satellite maps having labeled areas, possibly including those available via Google® Maps or OpenStreetMap™ (see URL openstreetmap.org).

With the payload ratio having been derived, the drone controller 120 may proceed with actuating payload apertures 117 or otherwise causing first and second (or more) payload bays 116-1, 116-2 to release first and second amounts of the respective payloads 20-1, 20-2 according to the payload ratio. For example, each payload aperture 117 may be open for a specified period of time and/or may be open to a specified degree (i.e., to a specified aperture size) in order to release the desired amount. To this end, a control signal may be issued to a suitable actuator via a wired connection between the central control unit 114 and the payload bay 116 (e.g., via a communication bus) or wirelessly via radio frequency communication. In a case where the payload bays 116-1, 116-2 are on the same drone 110 or on two or more drones 110 flying close to each other, simultaneous release may allow for mixing of the payloads 20 as described above. The machine learning model or other processing that derives the payload ratio may additionally derive delivery parameters such as delivery timing of each payload 20, delivery position (including height) of each payload 20, which of multiple delivery mechanisms/subsystems to use (e.g., droppers, pre-determined loads of discrete quantities, pellet/particle spreaders for different size payload particles, different rotation speed settings for spreaders, etc., different ballistic pellets/plugs/spikes for ground penetration in the case of a hard ground surface determined from ground attribute values), whether/how to effectuate payload mixing, etc. In the case of high winds, for example, the drone controller 120 may determine that one or both payloads 20-1, 20-2 should be dropped from a lower height and/or should be laterally offset from the ground-level target area.

This may depend on properties of each individual payload 20 such as its size, shape, wetness, etc. that might impact wind resistance (e.g., a fine power may be dropped closer to the ground, while a payload 20 having larger chunks may be dropped from a greater height to reduce dispersion). Another contemplated delivery parameter is the control of a shroud configuration around the propellers of a drone 110, which may be changed in real-time for dispersal of payload 20.

Along the same lines, to improve the accuracy of delivery, it is also contemplated that the drone controller 120 may cause one or both of the first and second payload bays 116-1, 116-2 to conduct a test release prior to the release of the first amount and the second amount. The test release may comprise the release of a small amount of one or both payloads 20-1, 20-2, after which it can be directly observed whether the payload(s) 20 were successfully delivered to the target area of the agricultural field 10 or other region of the ground and/or whether some correction ought to be made to the position of the drone(s) 110 or delivery parameters to more accurately deliver the payload(s) 20. For example, after a test release (or after an actual delivery for the benefit of future delivery and record-keeping), the drone controller 120 may determine a dispersion of one or both of the first and second payloads 20-1, 20-2 on the ground surface. Determining the dispersion may include, for example, measuring the time from release to when one or both of the first and second payloads 20-1, 20-2 reaches the ground, based on which a presumed area of actual delivery may be estimated. Alternatively, or additionally, the dispersion may be determined using one or more sensors 119 such as a camera as described above, which may be used to detect a payload stain color or ultraviolet (UV) signature indicating the location where the payload 20 has been delivered and thus the dispersion. Based on the dispersion, the drone controller 120 may adjust the release of one or both of the first and second payloads 20-1, 20-2.

FIG. 5 is a functional block diagram of the system 100. In addition to one or more drones 110 (two illustrated in FIG. 5), the system 100 may include a hub 130 which may comprise a stationary structure (e.g., a control tower) or mobile drone deployment truck that may function as a control center of the system 100 and/or as part of a sensor array used by the system 100 without necessarily participating directly in the delivery of payload 20. In this regard, it is contemplated that the drone controller 120 described in relation to FIG. 1 may be embodied in the hub 130, for example, in a hub processing unit 132 thereof. Alternatively, or additionally, the drone controller 120 may be embodied in one or more of the drones 110, for example, in a drone processing unit 152 thereof. In general, the drone processing unit 152 may be connected to one or more cameras or other sensors 119, (see also FIG. 1-4), such as load cells, altimeters, accelerometers, gyroscopes, inertial measurement units (IMU), compasses, tilt sensors, etc., a global positioning system (GPS) receiver 154, and one or more payload bays 116 including one or more payload apertures 117. The drone processing unit 152 may further be connected to a flight controller 156 (in the case of an unmanned aerial vehicle (UAV) or other aerial drone) or other movement controller as well as a drone communications interface 158 for communication with other drones 110 via drone communications interfaces 158 thereof or with a hub 130 via a hub communications interface 134 thereof. Any such components of the drone 110 may be included on board the drone 110, for example, in a central control unit 114 thereof (see FIGS. 2-4), or otherwise mounted internal or external thereof. The drone processing unit 152 may be responsible for various processing tasks and may, for example, control the overall operation of the drone 110. For example, if the drone processing unit 152 functions as the drone controller 120, the drone processing unit 152 may, by itself or in concert with other drones 110 and or a hub 130, obtain a location of the drone 110, determine a ground attribute value, derive the payload ratio, and cause the payload bay(s) 116 to release the payload(s) 20 as described above. The features shown in FIG. 5 are not intended to be exhaustive, and the drone 110 may include various other features not specifically shown, such as a noise abatement system, power supply systems, etc.

In the case of an aerial drone 110, the flight controller 156 may control flight of the drone 110, for example, by controlling propeller units 112 (see FIGS. 2-4) or other propulsion means in response to commands issued by the drone processing unit 152. The flight controller 156, in combination with the drone processing unit 152 and sensors 119, may control the flight of the drone 110 such that known obstacles such as trees and forests may be avoided. The drone 110 may use depth of field sensors such as those offered by PrimeSense to detect distance to objects in order to avoid them and may use a web mapping service such as Google Maps by Google Inc. to navigate the local landscape.

The drone communications interface 158 (and similarly the hub communications interface 134) may support communication by any conventional communication methods, such as by radio frequency according to cellular network modalities such as GSM (Global System for Mobile communications), CDMA, etc. or local area network modalities such as WiFi (e.g., 802.11, WiGig, etc), or any other communication means known within the art, for example, infrared, microwave, lasers, and/or ultrasonic communication. As mentioned above, one or more sensors 119 may be on board the drone 110 along with the drone processing unit 152, which may act as the drone controller 120 to determine ground attribute values and derive payload ratios for the payloads 20 (e.g., using one or more processors and memories of the drone processing unit 152 on board the drone 110). In this regard, it is contemplated that the drone 110 may act in a stand-alone configuration requiring no external instruction, making its own decision as to where, when, and to what relative degrees to open payload apertures 117 of onboard payload bays 116 while simultaneously issuing commands to the flight controller 156 to position the drone 110 as determined (e.g., by a machine learning model) for most efficient and effective delivery of the payload(s) 20 based on real-time conditions of the agricultural field 10 or region 12 thereof.

Even in a case where the drone controller 120 is entirely on board one or more of the drones 110, it may nevertheless be advantageous to employ some central or at least external decision-making functionality, e.g., via a fleet manager controller. For example, the determination of ground attribute values may not be the only relevant factor in deriving payload ratios or in deciding flight directions for the drone(s) 110. Other factors may include, for example, the existence of another agricultural field 10 or other delivery target or region 12 thereof of greater priority that is unknown to the individual drone 110, additional information about the ground including aspects not ascertainable by the drone 110, the existence of other drones 110 already en route to deliver payload 20 to the same delivery target, an overriding command to the drone 110 or a fleet including the drone 110 to return to a charging station or other base and cease payload delivery activity, a relevant weather forecast unknown to the drone 110, a physical obstruction unknown to the drone 110, etc. In view of such factors, the drone 110 may, via the drone communications interface 158, transmit a signal indicating one or more ground attribute values and/or a derived payload ratio determined by the drone processing unit 152 to a stationary hub 130 or a second drone 110 external to the drone 110 and receive a flight control signal from the hub 130 or second drone 110. In response to receipt of the flight control signal, the drone processing unit 152 may issue a command to the flight controller 156 and/or payload bays/apertures 116/117 to direct the drone 110 to deliver payload(s) 20 accordingly. Thus, the flight controller 156 and/or payload bays/apertures 116/117 may be directed in response to receipt of a control signal by the drone communications interface 158.

Instead of or in addition to the camera and/or other sensors 119 being on board the drone 110, a camera and/or other sensors 136 may be provided on the hub 130, whether or not the hub processing unit 132 functions as the drone controller 120. For example, the hub 130 may observe a wide range of local geography from a camera 119 positioned at a high vantage point. In a case where one or more processors and memories of the hub processing unit 132 perform at least some of the functionality of the drone controller 120, it is further contemplated that the hub 130, rather than the drone(s) 110, may obtain a location of the drone(s) 110, determine ground attribute(s), derive the payload ratio, and/or cause the payload bays 116 on board the drone(s) 110 to release the payloads 20. By the same token, some or all of the functionality of the drone controller 120 may be provided by another drone 110. Accordingly, the drone(s) 110 may, via the hub communications interface 134 and/or drone communications interface(s) 158, receive the relevant data and/or commands from the hub 130 and/or from another drone 110. For example, one combination of drone(s) 110 and/or hub 130 may first map/scan/analyze an agricultural field 10 or other ground surface, and then another drone or drones 110 may be sent in to execute payload delivery.

Regarding the use of a fleet of drones 110, such a fleet could act in coordination as a network (e.g., a mesh network). An example of coordinated flight plans for such a network of UAVs can be found in U.S. Pat. No. 8,862,285, issued Oct. 14, 2014 and entitled "Aerial Display System with Floating Pixels," the entirety of which is wholly incorporated by reference herein. Additional examples of coordinated drone/hub activity can be found in U.S. Pat. Nos. 10,434,451, issued Oct. 8, 2019, and U.S. Pat. No. 11,219,852, issued Jan. 11, 2022, both entitled "Apparatus and Method of Harvesting Airborne Moisture," the entirety of each of which is wholly incorporated by reference herein. A fleet of drones 110 may work in coordination with each other for faster coverage of an area with payload 20, each drone working independently and covering their own designated area. Alternatively, multiple drones 110 may work together where one drone 110 drops one payload 20-1 and a second drone 110 drops a second payload 20-1, with the payload ratio having been derived as described above and communicated to and/or among the individual drones 110. In other cases, one set of drones 110 may operate as "scouts" that use sensor platforms to map an area, possibly along with identifying the various ground attributes, while another set of drones 110 execute the delivery of payload 20. In some cases, the system 100 may be arranged as a network including one or more stationary hubs 130 and/or one or more drones 110. A hub 130 may act as a control/command center as described above and may also act as a drone battery charging or replacement station, a payload loading/unloading site, and/or a site of a human/drone interface for observation of drones 110, manual control, and/or programming, firmware updates, etc. As a specific example, a fleet of drones 110 may be programmed to deliver payloads 20 at a specific time each day and to thereafter return to a hub 130 for swapping of payload bays 117 and charging or battery replacement. Alternatively, one set of drones 110 may operate while another set of drones 110 is charging and/or having payloads 20 refreshed, and vice versa. If backup power is available (e.g., multiple redundant batteries or backup solar power), battery drop-off and pick-up could be achieved in flight. Daily flight paths could be charted using GPS, simultaneous localization and mapping (SLAM), visual simultaneous localization and mapping (vSLAM), etc. and logged, e.g., for error reporting. Through the use of geofencing, flight path reporting as well as human/drone interaction including updates and new instructions can be set to occur upon the entering of a drone 110 in the vicinity of the hub 130 without the need for physical docking.

As another example, a fleet comprising multiple drones 110 may be transported to an agricultural field 10 or other payload delivery target on a vehicle (or a plurality of vehicles) such as a truck, boat, blimp or other transport mechanisms capable of carrying a plurality of UAVs or other drones. The vehicle can act as the hub 130. As such, payload delivery activity can be directed to distant locations, and the drones 110 delivered close to the intended target, without expending fuel or battery power to reach the location. This may be especially useful for non-agricultural payload deliveries that may be far from developed areas, such as in the case of using the system 100 to deliver payloads 20 to stop the spread of wildfire, for erosion control, to clean up sewage spills or oil spills (e.g., by dropping biologics, detergents, bacteria, etc.), or to stop the spread of invasive plants and other species (e.g., by dropping herbicide, biologics, etc.) in a wilderness region. Drones 110 in communication with each other and/or the vehicle may be deployed or leave the vehicle, execute payload delivery in the nearby area as described herein, and return to the vehicle for replacement or refilling of payload bays 116. Also, the vehicle can have docking stations that allow charging of drones 110 during transport, or the drones 110 can return to the vehicle during the payload delivery activity to recharge, possibly via solar photovoltaic cells, and then re-deploy, as needed. After completing a payload delivery task in one location, the vehicle or vehicles may then move to other locations. In this way, the fleet of drones 110 may provide an on-demand service where payload delivery is needed or requested. The use of the vehicle may also reduce the necessary range of the drones 110 and/or allow the drones 110 to access areas that may otherwise be difficult to access.

Figure 6:
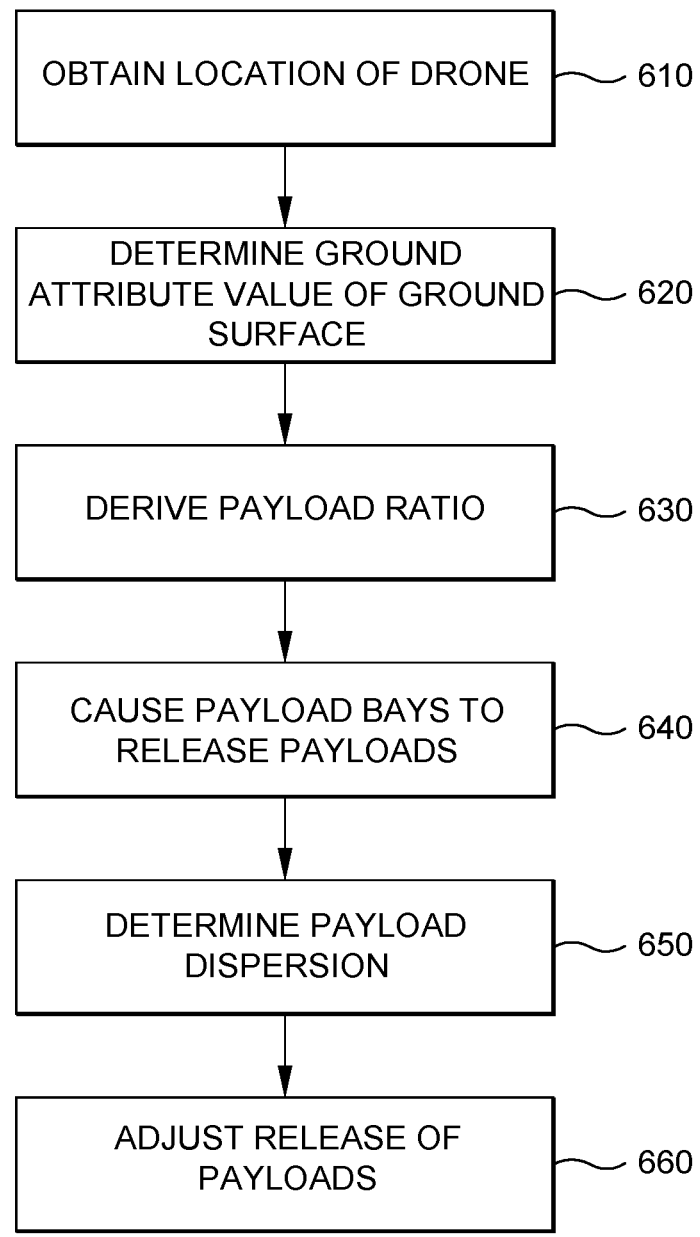
FIG. 6 shows an example operational flow according to one or more embodiments of the present disclosure.

FIG. 6 shows an example operational flow according to one or more embodiments of the present disclosure. The operational flow may be performed by the system 100 shown and described in relation to FIGS. 1-5 and may, for example, represent processing steps performed by the drone controller 120 of the system 100. As described above, the drone controller 120 itself may be embodied in processors/memories provided on board one or more drones 110 or in a stationary or mobile hub 130. In this regard, it is contemplated that the steps shown in FIG. 6 may in some cases be divided among different entities of the system 100. The operational flow may begin with obtaining a location of at least one drone 110 while the at least one drone 110 is in flight or otherwise deployed (step 610) and determining a ground attribute value of a ground surface associated with the location (step 620). The location may comprise a geolocation, a zip code, a geofenced area, a Schneider 2 (S2) cell, a grid location, a stationary location, a relative location, a landmark, a simultaneous localization and mapping (SLAM) location, a visual simultaneous localization and mapping (vSLAM) location, a wireless triangulation point, and/or a position relative to one or more beacons, for example. In some embodiments, an area can be broken down into subareas where each subarea may be tagged with its own specific ground attributes. It is noted that the location may comprise a location of an individual drone 110 or a location of a group of drones 110, such as an average location, a centroid, or a most relevant region, grid cell, etc.) The drone controller 120 (whether on board the drone 110 in question or not) may determine the ground attribute(s) based on a combination of the location and collected sensor data as described above for example (e.g., using cameras or other sensors 119, 136). The location may be used as an index to look up ground attribute(s) other than those that are determined from real-time sensor analysis, for example, such as a previous day's sensor measurements, and/or to look up relevant weather conditions, air traffic conditions, mission instructions, warnings, or other data associated with the location that may inform the drone(s) 110 how to proceed. In this regard, it should be recognized that the ground surface associated with the location need not necessarily have wholly unknown attributes and may comprise at least a portion of an a priori characterized area, for example. As such, the ground attribute value may be determined at least in part by reference to a previously characterized attribute of the ground surface associated with the location.

The operational flow of FIG. 6 may continue with deriving a payload ratio based on the ground attribute value(s) (step 630) and causing the payload bay(s) 116 to release respective amounts of the payloads 20 according to the payload ratio (step 640). For example, the drone controller 120, whether locally embodied or remotely embodied (e.g., on another drone 110 or hub 130), may input data features including the ground attribute value(s) to a lookup table, function, or machine learning model that may itself be stored locally or remotely (e.g., on a server or cloud-based infrastructure). Based on the output, the drone controller 120 may issue instructions to the payload bay(s) 116 or apertures 117 thereof, as well as to the corresponding flight controller(s) 156, to effectuate the delivery of payload 20 according to the payload ratio and any other delivery parameters as described herein. In this respect, the system 100 may be thought of as providing a location-based service that uses agricultural or other soil information to determine appropriate payload ratios at a fine level of detail.

In some embodiments, the instructions to the payload bay(s) 115, apertures 117, flight controller(s) 156, etc. may include execution of a path management routine (e.g., by the drone controller 120) that seeks to maximize or otherwise optimize usage of a given mixture of payloads 20 before moving on to a different mixture of payloads 20. For example, a path (e.g., along the ground) may be characterized by areas having common ground attribute(s). The drone(s) 110 may traverse a given path while delivering the payloads 20 at an unchanging payload ratio. Assuming the path is continuous, this would allow the drone to keep a constant rate of dropping rather than having to change the apertures 117 on the payload bay(s) 115. Traversing a non-continuous path having the same ground attribute(s) (i.e., with intervening regions having different ground attribute(s)) may also be beneficial, as the apertures 117 may simply be temporarily closed during the intervening regions with no new payload ratio calculations needing to be made.

The path management routine may optimize path definitions so that the drone(s) 110 drop a first amount per unit time, then a second, etc., perhaps beginning with smaller amounts and increasing until complete. In addition to making efficient use of time, battery life, and processing resources, such a routine may help to ensure that priorities are met in the case of unfinished payload delivery, e.g., that the largest areas are covered first, followed by smaller areas with different payload ratios.

The operational flow of FIG. 6 may additionally include determining a dispersion of one or more of the payloads 20 on the ground surface (step 650). For example, based on input to the camera(s) or other sensor(s) 119, 136, the drone controller 120 may determine a dispersion after the completed release of the payload(s) 20, during the release of the payload(s) 20, or after/during a test drop of the payload(s) 20. In a case where the delivery of the payload(s) 20 has not been completed, the drone controller 120 may adjust the release of the payload(s) 20 based on the dispersion (step 660), for example, to change the relative amounts of payload(s) 20 released and/or other delivery parameters (to make a correction for wind or ground contour, for example). The drone controller 120 may effectuate the adjustment by issuing new instructions to the payload bay(s) 116 or apertures 117 thereof and/or flight controller(s) 156, either mid-release or between a test release and the full release of the payload(s) 20. One or more steps of the operational flow of FIG. 6 may be repeated in a cyclical manner, with the drone(s) 110 in some cases continuing to drop payload 20 until requirements of a specific location are met (e.g., as may be known from redetermining ground attribute values in step 620).

In the above examples, aerial drones 110 such as UAVs are referred to as one possible drone 110 of the system 100. However, the system 100 need not necessarily be limited in this respect and other types of drones 110 may be used as well. For example, the one or more drones 110 may include ground-based drones 110 (e.g., tracked drones, walkers, wheeled robots, etc.) and/or aquatic drones in some case (in which case the ground surface to be targeted for delivery may be an underwater surface such as a seafloor). More generally, the ground surface may be solid ground (e.g., soil including sand, clay, silt, chalk, peat, loam, etc. or mixes thereof) such as the agricultural field 10 of FIG. 1 (plowed or unplowed) or may be forest, meadow, lawn, mountainside, or an ocean surface or other surface of water (as may be observed by an aerial drone 110, for example). The one or more drones 110 may be autonomous to varying degrees, for example, able to autonomously navigate and move to a location without collision, able to autonomously gather sensor data of the ground surface, able to autonomously deliver payload 20, etc. Alternatively, or additionally, the one or more drones 110 may allow for or require manual control for some or all of these functions.

The various functionality and processes described in relation to the system 100 of FIGS. 1-5 and the operational flow of FIG. 6, as well as in some cases the machine learning model(s) used by the system 100, may, in whole or in part, be embodied in a computer program product that may reside within or otherwise communicate with the drone(s) 110, drone controller(s) 120, and/or hub(s) 130 of the system 100. The computer program product may comprise one or more non-transitory program storage media (e.g., hard drive, FPGA, PLA, solid state drive, RAM, flash, ROM, etc.), that store computer programs or other instructions executable by one or more processors (e.g., a CPU or GPU) or programmable circuits to perform operations in accordance with the various embodiments of the present disclosure. The one or more non-transitory program storage media may in some cases reside external to the drone(s) 110, drone controller(s) 120, and/or hub(s) 130 of the system 100 such as in a cloud infrastructure (e.g., Amazon Web Services, Azure by Microsoft, Google Cloud, etc.) and/or a server system accessible via a network such as the Internet, with the computer programs or other instructions being provided to the drone(s) 110, drone controller(s) 120, and/or hub(s) 130 over the network. Examples of program instructions stored on a computer-readable medium may include, in addition to code executable by a processor, state information for execution by programmable circuitry such as a field-programmable gate arrays (FPGA) or programmable logic array (PLA).

Figure 7:
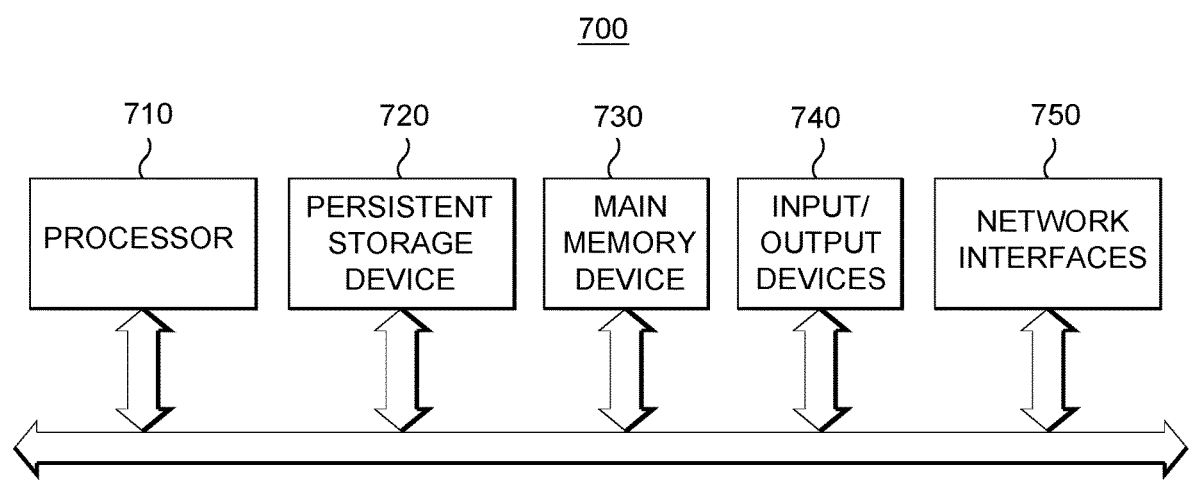
FIG. 7 is a high-level block diagram of an exemplary apparatus that may be used to implement systems and methods described herein.

By way of example, FIG. 7 is a high-level block diagram of an exemplary apparatus 700 that may be used to implement systems and methods described herein. The apparatus 700 may comprise a processor 710 operatively coupled to a persistent storage device 720 and a main memory device 730. The processor 710 may control the overall operation of apparatus 700 by executing computer program instructions that define such operations. The computer program instructions may be stored in persistent storage device 720, or other computer-readable medium, and loaded into main memory device 730 when execution of the computer program instructions is desired. For example, the drone processing unit 152 and other elements of the drone(s) 110 and/or hub 130 (e.g., the drone communications interface 158) may comprise one or more components of the apparatus 700. Similarly, the hub processing unit 132 and other elements of the hub 130 (e.g., the hub communications interface 134) may comprise one or more components of the apparatus 700. Thus, the operations described in relation to FIG. 6 and throughout the disclosure can be defined at least in part by the computer program instructions stored in main memory device 730 and/or persistent storage device 720 and controlled by processor 710 executing the computer program instructions. For example, the computer program instructions can be implemented as computer executable code programmed by one skilled in the art to perform an algorithm defined by the operations described herein. Accordingly, by executing the computer program instructions, the processor 710 may execute an algorithm defined by the described operations. The apparatus 720 may also include one or more network interfaces 750 for communicating with other devices via a network, e.g., via the drone communications interface 158 or the hub communications interface 134. The apparatus 700 may also include one or more input/output devices 740 that enable user interaction with the apparatus 700 (e.g., display, keyboard, mouse, speakers, buttons, etc.).

Processor 710 may include both general and special purpose microprocessors, and may be the sole processor or one of multiple processors of apparatus 700. Processor 710 may comprise one or more central processing units (CPUs), for example. Processor 710, persistent storage device 720, and/or main memory device 730 may include, be supplemented by, or incorporated in, one or more application-specific integrated circuits (ASICs) and/or one or more field programmable gate arrays (FPGAs).

Persistent storage device 720 and main memory device 730 each comprise a tangible non-transitory computer readable storage medium. Persistent storage device 720, and main memory device 730, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 740 may include peripherals, such as a printer, scanner, display screen, etc. For example, input/output devices 740 may include a display device such as a cathode ray tube (CRT), plasma or liquid crystal display (LCD) monitor for displaying information (e.g., an image recognition search result) to a user, a keyboard, and a pointing device such as a mouse or a trackball by which the user can provide input to apparatus 700.

One skilled in the art will recognize that an implementation of an actual computer or computer system may have other structures and may contain other components as well, and that FIG. 7 is a high level representation of some of the components of such a computer for illustrative purposes.

It should be noted that any computer described herein may include any suitable combination of computing devices, including servers, interfaces, systems, databases, agents, peers, engines, controllers, modules, or other types of computing devices operating individually or collectively. One should appreciate that any such computing device may comprise a processor configured to execute software instructions stored on a tangible, non-transitory computer readable storage medium such as those described above, and that the software instructions may configure the computing device to provide the roles, responsibilities, or other functionality as discussed above with respect to the disclosed subject matter. A system controller may comprise at least a computer-readable non-transient memory, a processor, and computer code saved on the memory with instructions that, when executed by the processor, perform functions. Any suitable computer-readable non-transient memory that allows software instructions to be saved or allows firmware to be flashed could be used, for example a hard disk, a solid state drive, ROM, a programmable EEPROM chip. In some embodiments, the various servers, systems, databases, or interfaces may exchange data using standardized protocols or algorithms, possibly based on HTTP, HTTPS, AES, public-private key exchanges, web service APIs, known financial transaction protocols, or other electronic information exchanging methods. Data exchanges may be conducted over a packet-switched network, the Internet, LAN, WAN, VPN, or other type of packet switched network a circuit switched network, cell switched network, or other type of network. As used herein, when a system, engine, server, device, module, or other computing element is described as configured to perform or execute functions on data in a memory, the meaning of "configured to" or "programmed to" may refer to one or more processors or cores of the computing element being programmed by a set of software instructions stored in the memory of the computing element to execute the set of functions on target data or data objects stored in the memory.

As used herein, and unless the context dictates otherwise, the term "coupled to" is intended to include both direct coupling (in which two elements that are coupled to each other contact each other or communicate directly with each other) and indirect coupling (in which at least one additional element is located between the two elements). Therefore, the terms "coupled to" and "coupled with" are used synonymously. Within the context of this document "coupled with" and "coupled to" are also considered to mean "communicatively coupled with" over a network, possibly through one or more intermediary devices.

The subject matter described herein is considered to include all possible combinations of the disclosed elements. Thus, if one disclosed example comprises elements A, B, and C, and a second example comprises elements B and D, then the subject matter described herein is also considered to include other remaining combinations of A, B, C, or D, even if not explicitly disclosed. As used in the description herein and throughout the claims that follow, the meaning of "a," "an," and "the" includes plural reference unless the context clearly dictates otherwise. All methods, processes, and operational flows described herein can be performed in any suitable order unless otherwise indicated herein or otherwise clearly contradicted by context. The use of any and all examples, or exemplary language (e.g., "such as") provided with respect to certain embodiments herein is intended merely to better illuminate the subject matter described herein and does not pose a limitation on the scope of the subject matter described herein unless claimed otherwise. No language in the specification should be construed as indicating any non-claimed element essential to the practice of the subject matter described herein. Groupings of alternative elements or embodiments of the subject matter described herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the concepts described herein. The disclosed subject matter, therefore, is not to be restricted except in the scope of the appended claims. Moreover, in interpreting both the specification and the claims, all terms should be interpreted in the broadest possible manner consistent with the context. In particular, the terms "comprise." "comprises," and "comprising." as well as the terms "include," "includes," and "including," should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A. B, C . . . and N, the text should be interpreted as requiring only one element from the group, not A plus N, or B plus N, etc.

The above description is given by way of example, and not limitation. Given the above disclosure, one skilled in the art could devise variations that are within the scope and spirit of the subject matter disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A drone-based payload management system comprising:
    at least one drone, the at least one drone having a first payload bay and a second payload bay, wherein the first payload bay is configured to store a first payload and the second payload bay is configured to store a second payload; and
    a drone controller coupled with the first and second payload bays and comprising at least one processor and at least one computer readable memory, the at least one computer readable memory storing software instructions executable by the at least one processor to perform operations comprising:
        obtaining a location of the at least one drone while the at least one drone is deployed;
        determining a ground attribute value of a ground surface associated with the location;
        deriving, based on the ground attribute value, a payload ratio of a first amount of the first payload relative to a second amount of the second payload;
        causing the first and second payload bays to release the first amount of the first payload and the second amount of the second payload respectively according to the payload ratio; and,
        after the first and second payload bays have released at least a portion of the first and second amounts, determining a dispersion of one or both of the first and second payloads on the ground surface, the dispersion being an area of actual payload delivery on the ground surface where the one or both of the first and second payloads has been delivered, the dispersion being determined using one or more cameras.

2. The system of claim 1, wherein the ground attribute value adheres to a ground attribute namespace or ontology.

3. The system of claim 1, wherein the ground attribute value quantifies one or more attributes selected from the group consisting of: a chemical attribute, an elevation attribute, a slope attribute, a physical attribute, an optical attribute, and a geographical attribute.

4. The system of claim 1, wherein the at least one drone comprises at least one unmanned aerial vehicle (UAV).

5. The system of claim 1, wherein at least one of the first amount and the second amount comprises an amount released per unit time or per unit area.

6. The system of claim 1, wherein the ground attribute value is derived at least in part from an image descriptor.

7. The system of claim 1, wherein the payload ratio is derived from the ground attribute value via one or more selected from the group consisting of: a lookup table, a function, and a machine learning model.

8. The system of claim 1, wherein one or both of the first and second payload bays comprises a controllable payload aperture coupled with the drone controller.

9. The system of claim 1, wherein the location comprises one or more selected from the group consisting of: a geolocation, a zip code, a geofenced area, a Schneider 2 (S2) cell, a grid location, a stationary location, a relative location, a landmark, a simultaneous localization and mapping (SLAM) location, a visual simultaneous localization and mapping (vSLAM) location, a wireless triangulation point, and a position relative to one or more beacons.

10. The system of claim 1, wherein said obtaining comprises obtaining a location of the at least one drone while the at least one drone is in flight.

11. The system of claim 1, wherein the first and second amounts are measured by weight.

12. The system of claim 1, wherein the first and second amounts are measured by volume.

13. The system of claim 1, wherein the payload ratio is in the range of 1:100 to 1:1.

14. The system of claim 1, wherein one or both of the first and second payloads comprises seeds.

15. The system of claim 1, wherein one or both of the first and second payloads comprises spores.

16. The system of claim 1, wherein one or both of the first and second payloads comprises one or more payloads selected from the group consisting of: fertilizers, insecticides, liquids, powders, slurries, conditioners, worms, biologics, and Mycorrhizal fungi.

17. The system of claim 1, wherein the second payload comprises calcium carbonate.

18. The system of claim 17, wherein the second payload comprises oolitic aragonite.

19. The system of claim 1, further comprising one or more sensors,
wherein the ground attribute value is determined based on an output of at least one sensor from among the one or more sensors.

20. The system of claim 19, wherein the one or more sensors includes one or more types of sensors selected from the group consisting of: a GPS sensor, an accelerometer, a LIDAR sensor, a RADAR sensor, a camera, a thermometer, a magnetometer, a gyroscope, an inertial measurement unit (IMU), and a spectrometer.

21. The system of claim 19, wherein the one or more sensors is provided in the at least one drone.

22. The system of claim 1, wherein the ground attribute value is determined in real-time from a digital representation of the ground surface.

23. The system of claim 1, wherein the operations further comprise causing one or both of the first and second payload bays to conduct a test release of a portion of the first and second amounts prior to the release of a remainder of the first amount and the second amount, the dispersion being determined based on the test release.

24. The system of claim 1, wherein said determining the dispersion includes measuring a time from release to when one or both of the first and second payloads reaches the ground.

25. The system of claim 1, wherein the operations further comprise adjusting release of one or both of the first and second payloads based on the dispersion.

26. The system of claim 1, wherein the at least one drone further has a third payload bay.

27. The system of claim 1, wherein the at least one drone comprises a fleet of two or more drones.

28. The system of claim 1, wherein the first payload bay and the second payload bay are included in the same drone from among the at least one drone.

29. The system of claim 1, wherein the at least one drone comprises at least one autonomous drone.

30. The system of claim 1, wherein the ground attribute value is determined at least in part by reference to a previously characterized attribute of the ground surface associated with the location.

31. A drone-based payload management method comprising:
obtaining a location of at least one drone while the at least one drone is deployed, the at least one drone having a first payload bay and a second payload bay, wherein the first payload bay is configured to store a first payload and the second payload bay is configured to store a second payload;
determining a ground attribute value of a ground surface associated with the location;
deriving, based on the ground attribute value, a payload ratio of a first amount of the first payload relative to a second amount of the second payload;
causing the first and second payload bays to release the first amount of the first payload and the second amount of the second payload respectively according to the payload ratio; and
after the first and second payload bays have released at least a portion of the first and second amounts, determining a dispersion of one or both of the first and second payloads on the ground surface, the dispersion being an area of actual payload delivery on the ground surface where the one or both of the first and second payloads has been delivered, the dispersion being determined using one or more cameras.

32. A computer program product comprising one or more non-transitory program storage media on which are stored instructions executable by one or more processors or programmable circuits to perform operations for drone-based payload management, the operations comprising:
obtaining a location of at least one drone while the at least one drone is deployed, the at least one drone having a first payload bay and a second payload bay, wherein the first payload bay is configured to store a first payload and the second payload bay is configured to store a second payload;
determining a ground attribute value of a ground surface associated with the location;
deriving, based on the ground attribute value, a payload ratio of a first amount of the first payload relative to a second amount of the second payload;
causing the first and second payload bays to release the first amount of the first payload and the second amount of the second payload respectively according to the payload ratio; and
after the first and second payload bays have released at least a portion of the first and second amounts, determining a dispersion of one or both of the first and second payloads on the ground surface, the dispersion being an area of actual payload delivery on the ground surface where the one or both of the first and second payloads has been delivered, the dispersion being determined using one or more cameras.

* * * * *